United States Patent [19]

Gunda et al.

[11] Patent Number: 4,537,029

[45] Date of Patent: Aug. 27, 1985

[54] POWER TRANSMISSION

[75] Inventors: Rajamouli Gunda, Rochester; Michael R. McCarty, Troy; Melvin A. Rode, W. Bloomfield, all of Mich.

[73] Assignee: Vickers, Incorporated, Troy, Mich.

[21] Appl. No.: 421,817

[22] Filed: Sep. 23, 1982

[51] Int. Cl.$^3$ ........................ F15B 9/09; F16H 39/46

[52] U.S. Cl. ........................................ 60/390; 60/421; 60/422; 60/429; 60/430; 60/446; 60/452; 91/363 R; 91/513; 91/516; 91/517; 91/518

[58] Field of Search ................. 60/328, 421, 422, 428, 60/429, 430, 486, 446, 452, 413, 484, 388, 390; 91/36, 513, 514, 516, 517, 518, 532, 363 A, 363 R, 365, 461

[56] References Cited

U.S. PATENT DOCUMENTS

| | | | |
|---|---|---|---|
| 3,437,312 | 4/1969 | Jenny | 91/365 |
| 3,713,291 | 1/1973 | Kubik | 60/446 |
| 3,955,369 | 5/1976 | Kubilos | 60/446 |
| 4,024,710 | 5/1977 | Zelle | 60/486 |
| 4,070,857 | 1/1978 | Wible | 60/422 |
| 4,139,987 | 2/1979 | Budzich | 60/452 |
| 4,212,165 | 7/1980 | Zirps | 60/486 |
| 4,215,543 | 8/1980 | Miller | 60/446 |
| 4,369,625 | 1/1983 | Izumi et al. | 60/429 |
| 4,378,675 | 4/1983 | Otto | 60/422 |
| 4,422,290 | 12/1983 | Huffman | 60/422 |

*Primary Examiner*—Charles T. Jordan
*Assistant Examiner*—Richard Klein
*Attorney, Agent, or Firm*—Barnes, Kisselle, Raisch, Choate, Whittemore & Hulbert

[57] ABSTRACT

An electrohydraulic control system which includes first and second electrically controlled fully variable hydraulic pumps adapted to be driven by the vehicle engine. In the specific embodiment of the invention herein disclosed, the first pump is coupled to the steering and braking control valves, and the second pump is coupled to the bucket and hoist control valves. An electrically controlled poppet valve selectively interconnects the respective pump outputs. Operator-responsive controllers, namely a bucket/hoist joy-stick controller, a vehicle propulsion controller and a steering controller, provide associated electrical signals as respective functions of operator demand. Electrically operated valves control application of hydraulic fluid to the bucket and hoist drive mechanisms, and pressure and position sensors are connected to such valves and actuating mechanisms. An electronic controller receives inputs indicative of operator demands, pump outputs, and operation at the hoist and bucket, and selectively controls or modulates the cartridge valve, the pumps, and the hoist and bucket valves for operation at optimum efficiency.

6 Claims, 3 Drawing Figures

POWER TRANSMISSION

The present invention relates to power transmissions, and more particularly to systems for controlling application of hydraulic fluid power among motive and implement applications on an engine-driven vehicle.

BACKGROUND OF THE INVENTION

On engine-driven construction vehicles such as wheel loaders having separate motive (steering and braking) and implement (bucket and hoist) hydraulic power systems, it has heretofore been proposed to provide separate engine-driven hydraulic pumps for motive and implement applications, and to interconnect the respective systems for cross-assistance as required. Such prior art systems embody fixed displacement pumps coupled to the vehicle engine for providing an output which varies only with engine speed. Thus, at times of low hydraulic power demand, the pumps may provide more hydraulic power than required and thereby waste engine fuel, while the pumps may overload and stall the engine at times of high demand. It has thus been proposed to provide a hydromechanical cross-link between the respective hydraulic systems responsive to engine speed and pump flow to provide interconnection therebetween for mutual assistance at times of high demand on one system but not the other.

OBJECTS AND SUMMARY OF THE INVENTION

An object of the present invention is to provide a hydraulic control system of the described type which embodies improved efficiency and control versatility as compared with prior art systems of the type previously described.

Another object of the invention is to provide such a hydraulic system which is economical to manufacture and reliable in long-term operation.

A further object of the invention is to provide a system for controlling application of hydraulic pressure to vehicle working implements, such as the bucket and hoist of a wheel loader, which reduces requirement for manual control intervention by a vehicle operator.

The foregoing and other objects are obtained in accordance with the present invention by providing first and second electrically controlled fully variable hydraulic pumps adapted to be driven by the vehicle engine. In the specific embodiment of the invention herein disclosed, the first pump is coupled to the steering and braking control valves, and the second pump is coupled to the bucket and hoist control valves. An electrically controlled poppet valve selectively interconnects the respective pump outputs. Operator-responsive controllers, namely a bucket/hoist joystick controller, a vehicle propulsion controller and a steering controller, provide associated electrical signals as respective functions of operator demand. Electrically operated valves control application of hydraulic fluid to the bucket and hoist drive mechanisms, and pressure and position sensors are connected to such valves and actuating mechanisms. An electronic controller receives inputs indicative of operator demands, pump outputs, and operation at the hoist and bucket, and selectively controls or modulates the poppet valve, the pumps, and the hoist and bucket valves for operation at optimum efficiency.

The proposed concept is applicable to any engine driven vehicle with multiple loads. However, for simplicity, a wheel loader with two implement loads and one traction load is described in the preferred embodiments.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1A:
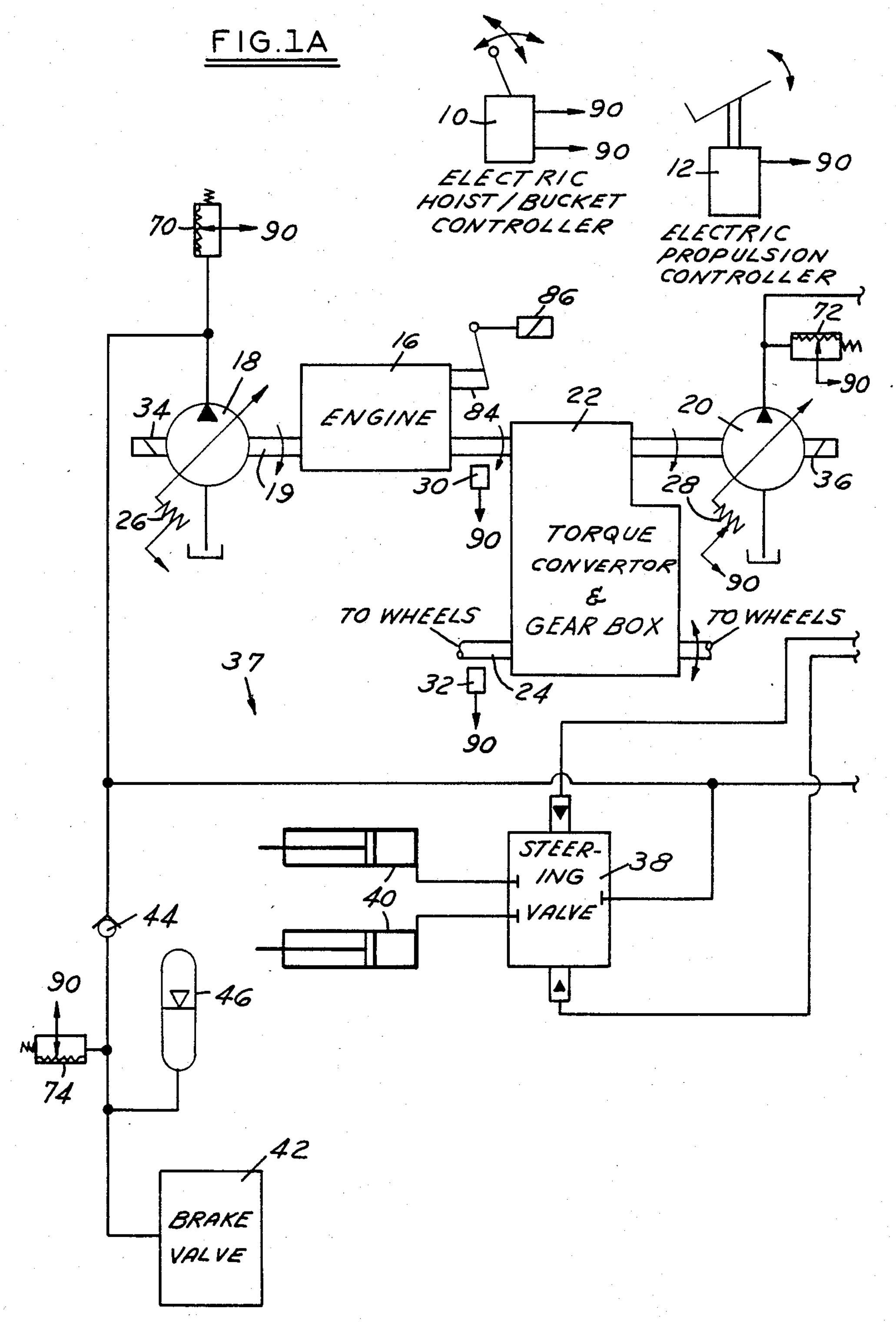
FIGS. 1A and 1B together comprise a schematic diagram of an electrohydraulic control system in accordance with a presently preferred embodiment of the invention as applied to a wheel loader.
Figure 1B:
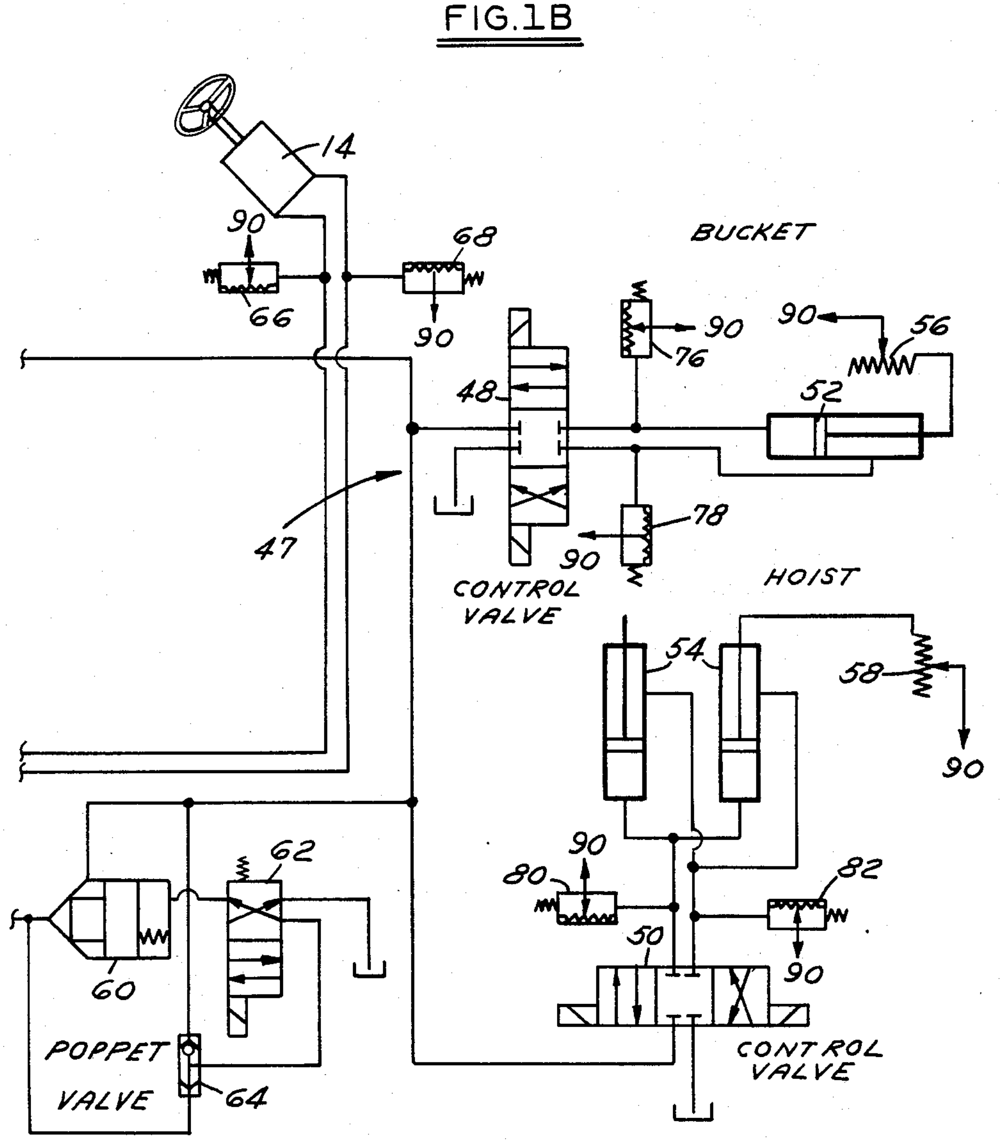

FIGS. 1A and 1B illustrate an electrohydraulic control system in accordance with the invention as including an operator joystick controller 10 for providing a pair of electrical output signals indicative of desired motion at the vehicle bucket and hoist respectively, a propulsion controller 12 for providing an electrical output signal as a function of vehicle propulsion desired by an operator, and a steering control unit 14 for providing complementary hydraulic outputs to control vehicle steering. A vehicle engine 16 is coupled by a crankshaft 19 to first and second hydraulic pumps 18,20, and by a suitable transmission such as a torque converter and gear box 22 to a wheel drive shaft 24. Pumps 18,20 comprise fully variable electrically controlled pumps with respective sensors 26,28 for providing electrical signals indicative of pump output. For example, pumps 18,20 may comprise variable displacement in-line piston pumps, with sensors 26,28 being responsive to pump yoke position. Preferably, pumps 18,20 have differing maximum outputs. Each pump 18,20 is controlled by a corresponding solenoid 34,36. A pair of sensors 30,32 are respectively disposed to provide electrical signals indicative of angular rotation at shafts 19,24, e.g. position, velocity and/or acceleration, etc.

Pump 18 is coupled by suitable hydraulic lines to power the motive (steering and braking) hydraulic system 37. Motive hydraulic system 37 includes a steering valve 38 which is coupled by the drive cylinder 40 to the vehicle steering mechanism (not shown). Steering valve 38 is controlled by hydraulic inputs from steering controller 14. A valve 42 for controlling vehicle brakes (not shown) is connected by a check valve 44 to pump 18. A hydraulic accumulator 46 is connected between check valve 44 and brake valve 42. Pump 20 is coupled by suitable hydraulic lines to power the implement (bucket and hoist) hydraulic system 47 which includes a pair of solenoid-operated variable position directional valves 48,50. Valve 48 is connected to supply hydraulic fluid to the drive cylinder 52, which in turn is connected to the bucket actuator mechanism (not shown). Valve 50 is connected to supply hydraulic fluid to the cylinders 54, which in turn are connected to the hoist actuating mechanism (not shown). A pair of sensors 56,58 are respectively connected to the bucket and hoist drive pistons (and thus to the bucket and hoist, not shown) to provide electrical signals indicative of bucket and hoist position and/or velocity.

A poppet valve 60 is controlled by a solenoid-operated directional valve 62 to selectively interconnect hydraulic systems 37,47. Valve 62 receives hydraulic power through a double-check shuttle valve 64 from the system 37,47 of higher pressure. A pair of pressure sensors 66,68 are disposed at the output of steering controller 14. Similar sensors 70,72,74,76,78 and 80,82 are disposed at pumps 18,20, accumulator 46, valve 48 and valve 50 respectively. Engine 16 has a throttle 84 operated by a solenoid 86.

Figure 2:
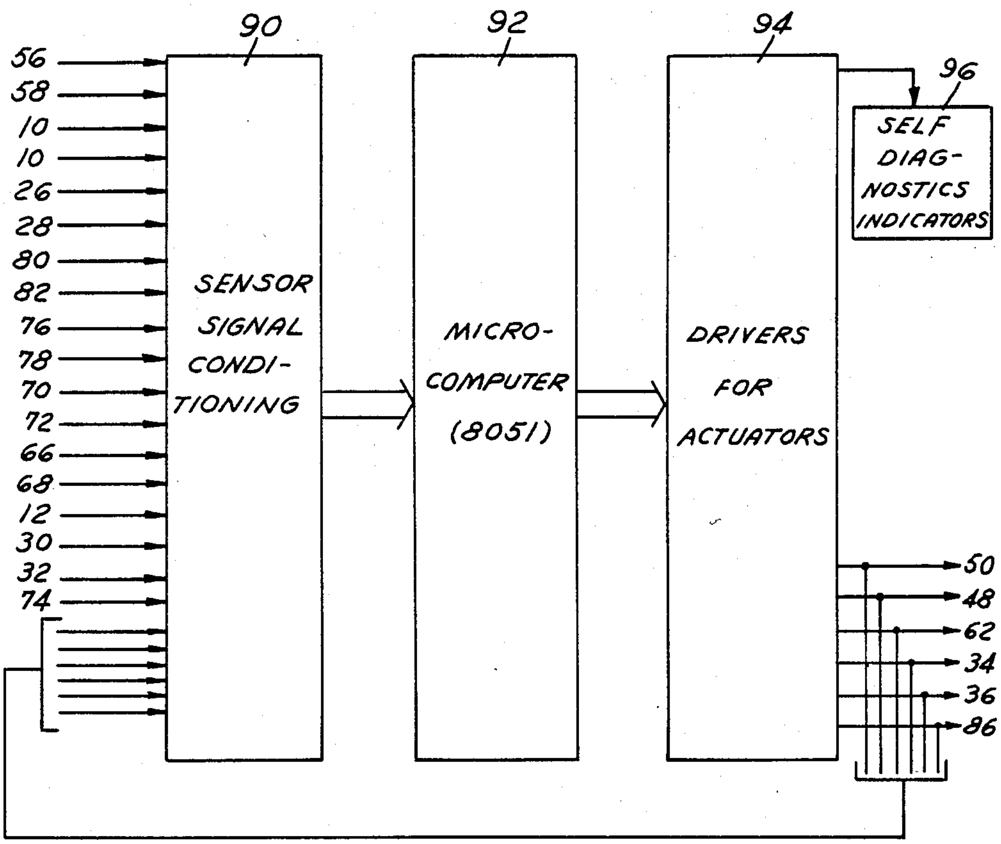
FIG. 2 is a functional block diagram of an electronic system controller in accordance with the invention.

FIG. 2 illustrates an electronic controller in accordance with the invention for individually and selectively operating pump solenoids 34,36, throttle solenoid 86 and solenoid-operated valves 48,50,62. The electronic controller of FIG. 2 includes an input circuit 90 for receiving signals from the various controllers and sensors in FIGS. 1A or 1B, and for conditioning the same for transmission to a microprocessor 92. Input circuit 90 receives electrical signals from operator controllers 10,12, pressure sensors 66-82, bucket and hoist position sensors 56,58, and pump displacement sensors 26,28. Microprocessor 92 directs output control signals through a driver circuit 94 to hoist valve 50, bucket valve 48, engine throttle solenoid 86, pump control solenoids 34,36 and poppet valve 62. These driver outputs are also fed as inputs to input circuit 90 for diagnostic purposes. All solenoid drive signals are pulse-width modulated to effect the desired control.

In operation of the invention, the control circuit of FIG. 2 operates the controlled elements of FIGS. 1A and 1B to obtain maximum efficiency of the hydraulic system for a given load demand. For example, in a preferred embodiment of the invention, pumps 18,20 have differing maximum capacities. Either or both pumps may be selectively operated depending upon demand. Thus, for low demand, only one pump need be operated, while for higher demand one pump may be operated at maximum pumping efficiency and the other varied as desired. When demands are simultaneously made on both implement valves 48,50, the valve associated with the highest load pressure is controlled to the fully open position, and the pump 18 and/or 20 provides the sum of both flow demands. The low-pressure implement valve is then modulated by the closed loop control to provide the desired velocity at the low-pressure implement. Single implement load velocity demands are controlled by fully opening the appropriate implement valve and controlling pump(s) output flow. This reduces overall valve losses and pump inefficiencies. Engine throttle solenoid 36 is activated as a combined function of propulsion demand from operator controller 12 and hydraulic load demand for the hoist and bucket.

In addition to the basic control features hereinabove described, a number of additional features are envisioned. For example, the joystick controller 10 could be equipped with a "teach" button which may be activated by the operator to program repetitive operations into microprocessor 92. Thereafter, implement operation may be semi-automatic. The microcomputer may also be programmed to maintain the bucket in a level orientation, which would eliminate any requirement for special mechanical links, etc. A third option is an automatic-shake feature when the bucket is dumping, which would be advantageous when handling muddy or sticky material. The microprocessor could be programmed to control engine throttling if the wheels begin slipping. The microprocessor may also be programmed to effect a complete diagnostic routine and display the results as at 96 to an operator.

It will be appreciated that the individual electrical, electro-hydraulic and hydraulic components illustrated in FIGS. 1A, 1B and 2 are of conventional construction.

The invention claimed is:

1. A system for controlling distribution of hydraulic power between first and second applications comprising hydraulic pump means responsive to electrical pump control signals for controlling hydraulic output of said pump means, first and second motive actuators for respectively performing first and second hydraulic power applications, first and second hydraulic valve means responsive to first and second electrical valve control signals for connecting said pump means to said first and second actuators respectively, first and second operator control means respectively associated with said first and second applications, said control means including means for sensing operator motion demands at said first and second applications and means for providing first and second demand signals as a respective function of such operator demands, first and second pressure sensor means respectively coupled to said first and second motive actuators for providing first and second pressure sensor signals as respective functions of hydraulic pressure at said first and second actuators, first and second motion sensor means respectively coupled to said first and second actuators for providing first and second motion sensor signals as respective functions of actual motion at said actuators, and electronic control means responsive to said first and second demand signals from said operator control means and to said first and second motion sensor signals from said motion sensor means for providing said pump control signals, and said first and second valve control signals as a function of total operator demand, said control means including means responsive to the sum of said first and second demand signals for operating said pump means to satisfy total operator demand at said first and second applications, means for each said application responsive to said first and second demand signals and to said first and second motion sensor signals for controlling said first and second valve means so as to proportion output of said pump means between said first and second actuators, and means responsive to said first and second pressure signals for completely opening the said valve means associated with the greater pressure at said first and second actuators and modulating the other of said valve means associated with the lesser of said pressures to provide demand motion at each of said actuators.

2. The system set forth in claim 1 wherein said hydraulic pump means comprises a variable displacement pump responsive to said pump control signals from said electronic control means.

3. The system set forth in claim 2 wherein said first and second operator control means comprises means for providing said demand signals as a function of operator velocity demand, and wherein said first and second motion sensor means comprise first and second velocity sensor means responsive to actual velocity at said actuators.

4. On an engine-driven vehicle which includes an hydraulically-powered motive application and at least first and second hydraulically-powered implement applications, a system for controlling distribution of hydraulic power among said motive and implement applications comprising hydraulic pump means coupled to the vehicle engine and responsive to electrical pump control signals for controlling hydraulic output of said pump means, first and second motive actuators for respectively performing said first and second implement applications, first and second hydraulic valve means responsive to first and second electrical valve control signals for connecting said pump means to said first and second actuators respectively, first and second operator control means respectively associated with said first and second implement applications, said control means including means for sensing operator motion demands at said first and second implement applications and means for providing first and second demand signals as a respective function of such operator demands, first and second motion sensor means respectively coupled to said first and second actuators for providing first and second motion sensor signals as respective functions of actual motion at said actuators, first and second pressure sensor means respectively coupled to said first and second motive actuators for providing first and second pressure sensor signals as respective functions of hydraulic pressure at said first and second actuators, and electronic control means responsive to said first and second demand signals from said operator control means and to said first and second motion sensor signals from said motion sensor means for providing said pump control signals, and said first and second valve control signals as a function of total operator demand, said control means including means responsive to the sum of said first and second demand signals for operating said pump means to satisfy total operator demand at said implement applications, and means responsive to said first and second pressure sensor signals for completely opening the said valve means associated with the greater pressure at said first and second actuators and modulating the other of said valve means associated with the lesser of said pressures so as to proportion output of said pump means between said first and second actuators and thereby provide demand motion at each of said actuators.

5. The system set forth in claim 4 further comprising a third actuator for performing said motive application, third hydraulic valve means responsive to a third electrical valve control signal for connecting said pump means to said third actuator, and third operator control means include means for sensing operator demand at said motive application and means for providing a third demand signal as a function of said operator demand, said control means including means responsive to said third demand signal for providing said third valve control signal to said third hydraulic valve means.

6. The system set forth in claim 5 wherein said hydraulic pump means comprises first and second variable displacement hydraulic pumps having differing maximum outputs independently responsive to said pump control signals, first fluid flow means connecting said first pump to said third valve means, second fluid flow means connecting said second pump to said first and second valve means, and fourth valve means responsive to a fourth valve control signal for selectively interconnecting said first and second fluid flow means, said control means including means responsive to the sum of said first, second and third demand signals for providing said fourth valve control signal as a function of total hydraulic power demand.

* * * * *